United States Patent
Joshi et al.

(10) Patent No.: US 7,577,671 B2
(45) Date of Patent: Aug. 18, 2009

(54) USING ATTRIBUTE INHERITANCE TO IDENTIFY CRAWL PATHS

(75) Inventors: Vijay S. Joshi, Bangalore (IN); Dharani Karthikeyan, Bangalore (IN)

(73) Assignee: SAP AG, Walldorf (DE)

( * ) Notice: Subject to any disclaimer, the term of this patent is extended or adjusted under 35 U.S.C. 154(b) by 345 days.

(21) Appl. No.: 11/107,596

(22) Filed: Apr. 15, 2005

(65) Prior Publication Data
US 2006/0235858 A1   Oct. 19, 2006

(51) Int. Cl.
G06F 7/00   (2006.01)
(52) U.S. Cl. .............................. 707/100; 707/10; 707/3; 707/9; 709/217; 709/224
(58) Field of Classification Search .................. 707/3, 707/9, 10, 100; 709/217, 224; 370/245
See application file for complete search history.

(56) References Cited

U.S. PATENT DOCUMENTS

| | | | |
|---|---|---|---|
| 6,356,910 B1 * | 3/2002 | Zellweger | 707/100 |
| 6,638,314 B1 * | 10/2003 | Meyerzon et al. | 715/234 |
| 6,982,960 B2 * | 1/2006 | Lee et al. | 370/254 |
| 2001/0018698 A1 * | 8/2001 | Uchino et al. | 707/533 |
| 2002/0130907 A1 * | 9/2002 | Chi et al. | 345/853 |
| 2002/0147805 A1 * | 10/2002 | Leshem et al. | 709/223 |
| 2003/0050915 A1 * | 3/2003 | Allemang et al. | 707/1 |
| 2003/0131097 A1 * | 7/2003 | Kasriel et al. | 709/224 |
| 2003/0149694 A1 * | 8/2003 | Ma et al. | 707/9 |
| 2003/0182305 A1 * | 9/2003 | Balva et al. | 707/103 R |
| 2003/0233362 A1 * | 12/2003 | Nolan et al. | 707/100 |
| 2004/0174397 A1 * | 9/2004 | Cereghini et al. | 345/855 |
| 2005/0086206 A1 * | 4/2005 | Balasubramanian et al. | 707/3 |
| 2006/0085397 A1 * | 4/2006 | D'Urso | 707/3 |
| 2006/0085427 A1 * | 4/2006 | D'Urso | 707/10 |

* cited by examiner

Primary Examiner—Hung Vy
Assistant Examiner—Binh V Ho
(74) Attorney, Agent, or Firm—Mintz, Levin, Cohn, Ferris, Glovsky & Popeo, P.C.

(57) ABSTRACT

A system and method for identifying crawl paths of a web cruise operation, where each crawl path represents successive uniform resource locator (URL) nodes in a parent/child relationship. One or more seed URLs are identified for the web cruise operation, each seed URL defining an origination of at least one crawl path. A set of attributes of each parent URL in each crawl path are identified to be inherited by one or more child URLs found in the web cruise operation. Then, each child URL is associated with the set of attributes identified for all parent URLs in the crawl path.

12 Claims, 4 Drawing Sheets

Cruise Name (Example)

Cruise Parameters

Seed URLs = www.sap.com, www.ibm.com

Max depth = 100

File types = html, ppt, doc, jpg

Exclude server = www.cnn.com

Regular Expression fileTypes = *.html, *.ppt, *.doc, *.jpg

USING ATTRIBUTE INHERITANCE TO IDENTIFY CRAWL PATHS

BACKGROUND

A web crawler is a software application that can crawl the both the Internet and enterprise intranets. A unit of crawling is called a cruise, and includes a branching tree of paths where each node is a Web page. For each cruise, a web crawler can take a number of inputs, including certain initial or seed URLs, a maximum depth of nodes to be crawled, and/or a set of one or more regular expressions to which the crawled URLs must adhere.

FIG. 1 shows an example input 10 for a web crawler. During a cruise, the web crawler visits each of the seed URLs, parses the HTML content obtained from each URL for links contained in each URL. The user can override the general parser to locate or ignore specific types of links, such as advertising links. Next, the web crawler visits the contained URLs, iterating the process to make sure that no link is visited twice. The input 10 causes the web crawler to crawl the specified seed websites, i.e. to a specified depth of 100, and for all HTML, PPT, DOC, and JPG files, but cuts short a cruise branch at the CNN link. FIG. 2 shows a result 12 of a cruise according to input 10.

The results of a cruise by the web crawler can be used for various applications or scenarios. A text mining system, for example as implemented in the Text Retrieval and Extraction (TREX) component of the SAP NetWeaver technology platform, can index the HTML contents obtained from the links visited by the web crawler to enable a full text search over these contents and/or documents. The text mining system can also add attributes to the indexed pages and documents to enable a search over these attributes. For example, the attributes may be metadata provided with a document, such as author, title, and so on.

For these and other applications of web crawler results, it may be useful to know which seed URL led to a given content or document. However, for many Web pages, it is difficult to know from the page's URL which seed URL led to the page. For example, a URL may contain an IP addresses that has no association with the seed URL, or contain no path information to show the path by which the URL was accessed. Further, the number of URLs and documents crawled during a cruise can number in the millions, making a quick determination of the seed URL very difficult.

SUMMARY

This document discloses systems and methods for executing a web cruise operation and for identifying crawl paths of the web cruise. Each crawl path represents successive uniform resource locator (URL) nodes in a parent/child relationship. In one aspect, a method of identifying crawl paths of a web cruise operation includes the step of identifying one or more seed URLs for the web cruise operation, where each seed URL defines an origination of at least one crawl path.

The method further includes the steps of identifying a set of attributes of each parent URL in each crawl path to be inherited by one or more child URLs found in the web cruise operation, and associating each child URL with the set of attributes identified for all parent URLs in the crawl path. In another aspect, a method further includes the step of receiving cruise parameters for the web cruise operation, where the cruise parameters define uniform resource locator (URL) access actions to generate the one or more crawl paths.

In yet another aspect, a system is provided for executing a web cruise operation. The system includes a cruise service providing at least one web crawler tool, the cruise service being configured to receive cruise parameters defining uniform resource locator (URL) access actions to generate one or more crawl paths. Each crawl path represents successive URL nodes in a parent/child relationship. The web crawler is configured to identify a set of attributes of each parent URL in each crawl path to be inherited by one or more child URLs found in the web cruise operation.

The system further includes an index server having a text mining engine for generating a text-based index of text-based data objects associated with each child URL found in the web cruise operation, the index server also having an attribute engine for generating an attribute index of a set of attributes inherited by each child URL found in the web cruise operation.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 1 shows an example of input for a web crawler as a regular expression.

Like reference symbols in the various drawings indicate like elements.

DETAILED DESCRIPTION

Figure 2:
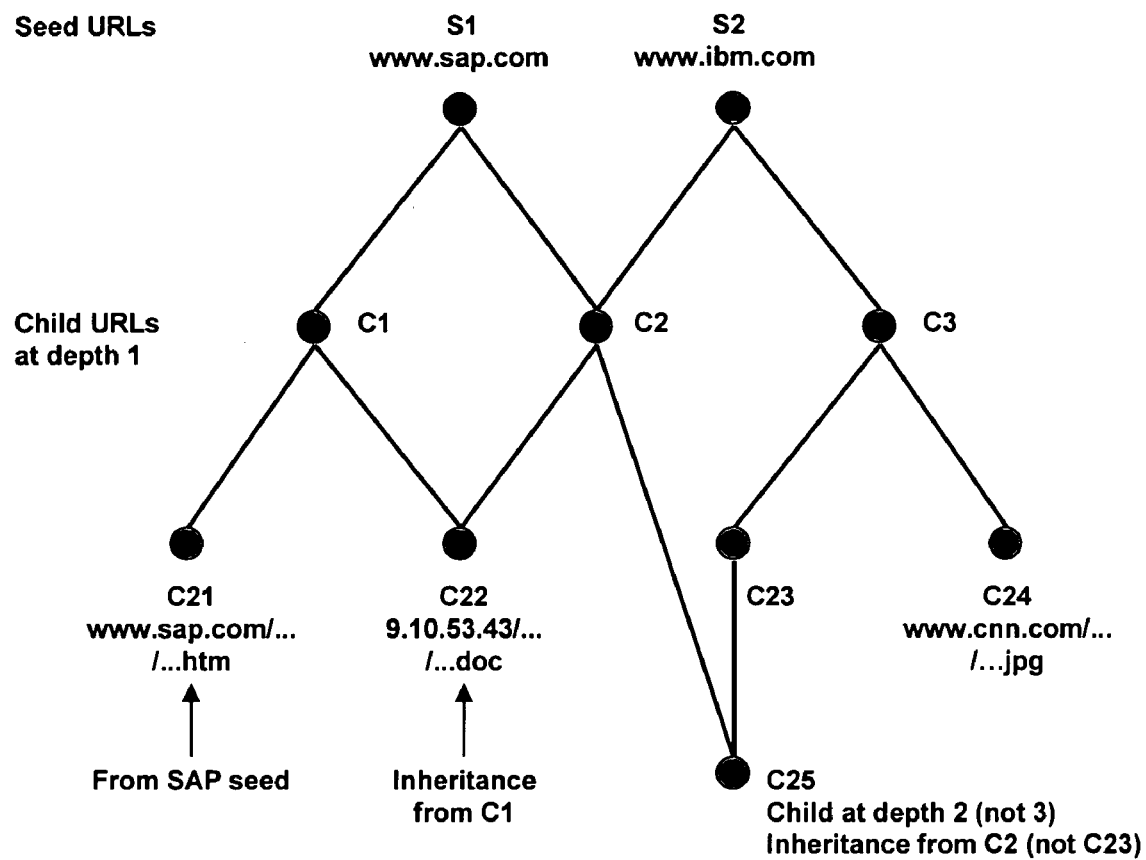
FIG. 2 shows a cruise tree resulting from a cruise.

When a web crawler user specifies one or more seed URLs for a cruise, as shown by means of an example in FIG. 1, the user can also specify a set of attributes with values that are to be inherited by each URL crawled from particular seed URLs. As an example, and with reference to FIG. 2, a user can specify that any URL on a path starting from S1 (www.sap.com) may have an attribute "server" with value "SAP," and any URL on a path starting from S2 (www.ibm.com) may have attribute "server" with value "IBM."

Figure 3:
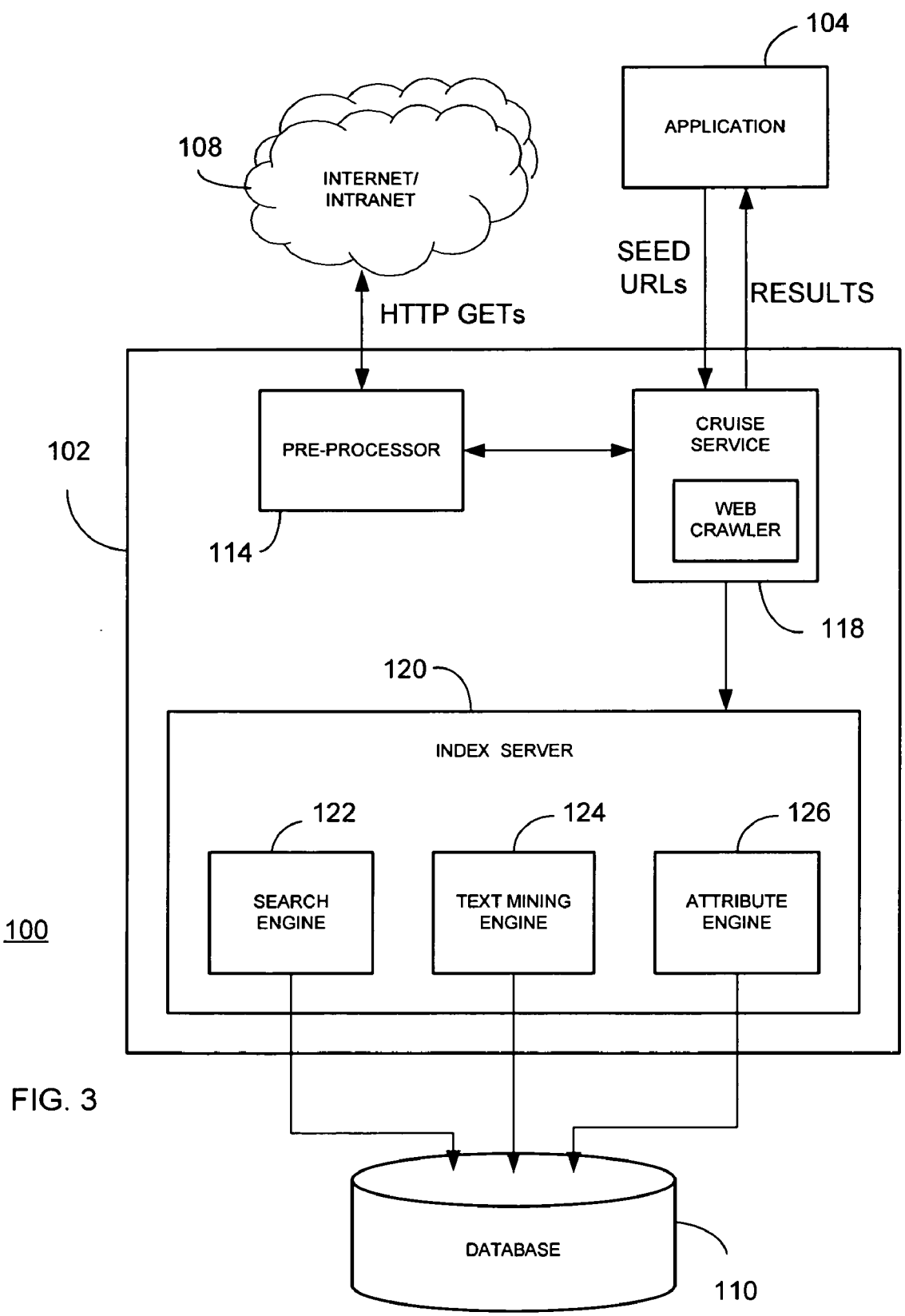
FIG. 3 shows a system for executing a cruise using attribute inheritance to identify crawl paths.

FIG. 3 shows a computer communication network 100 having a system 102 for executing a cruise of the internet 108 or other URL-based networks such as a corporate intranet, for an application 104 using attribute inheritance to identify crawl paths for the cruise. The system 102 includes a preprocessor 114 and a cruise service 118. The system 102 also includes an index server 120 having a search engine 122 configured to search web pages based on key terms, a text mining engine 124 that works with the search engine 122 to perform intelligent text-based searching and retrieval on text-based objects associated with web pages, and an attribute engine 126 configured to extract attributes from searched web pages. The exact configuration of these three engines is inessential to the invention and their functions may be combined into one engine in other embodiments.

The application 104 initiates a cruise by sending seed URLs to the cruise service 118, which instantiates a web cruise to execute a specified cruise. The web crawler sends the seed URLs to the preprocessor 114, which generates "HTTP Gets" for each seed URL to retrieve the contents from the URLs over the internet 108, where these contents include text documents in various formats and the document attributes.

Crawl paths for a cruise are identified as follows. The cruise is specified by a regular expression, an example of which is shown in FIG. 1. The first seed URLs are sent to the preprocessor 114, which gives a callback to the cruise service 118 upon initiation of the cruise. The cruise service then sends the regular expression specifying the cruise parameters for that particular cruise to the preprocessor. The preprocessor 114 compiles the regular expression and uses it to steer the cruise along the desired crawl paths. The preprocessor 114 uses the regular expression to analyze the retrieved web pages and to extract any URLs that match the cruise parameters, and retrieves the web pages corresponding to those further URLs.

The web crawler in the cruise service 118 stores both the list of URLs that define the crawl path and the attributes and their values for each cruised page. As each node is cruised, the preprocessor 114 sends the retrieved text and attributes to the web crawler. The web crawler sends the text and attributes to the index server 120. In the index server 120, the text mining engine 124 indexes the text and the attribute engine 126 indexes the attributes. The indexes created are stored in the database 110.

During a cruise, the web crawler in the cruise service 118 remembers these attributes and their values for each and every URL crawled during the cruise, and attaches the remembered attribute values to the page or document obtained from each URL. The attributes and their values are inherited by every child node in each path from the parent nodes. In case a page is reached from two seed URLs, such that a crawled node inherits multi-valued attributes, the attributes from the seed URL with the shorter path, i.e. the lesser depth, are taken for the reached URL.

When the text mining engine 124 indexes the crawled pages, it also indexes the attribute values. The system 102 may also receive from a user the attributes to be inherited during runtime, after creation of the cruise. These new attributes are assigned to all subsequently crawled pages. For any attribute specified anew during runtime, the new specification supersedes any existing specification. Accordingly, for any page crawled during a cruise, the system 102 can discover which seed URL led to it by performing an attribute search.

Figure 4:
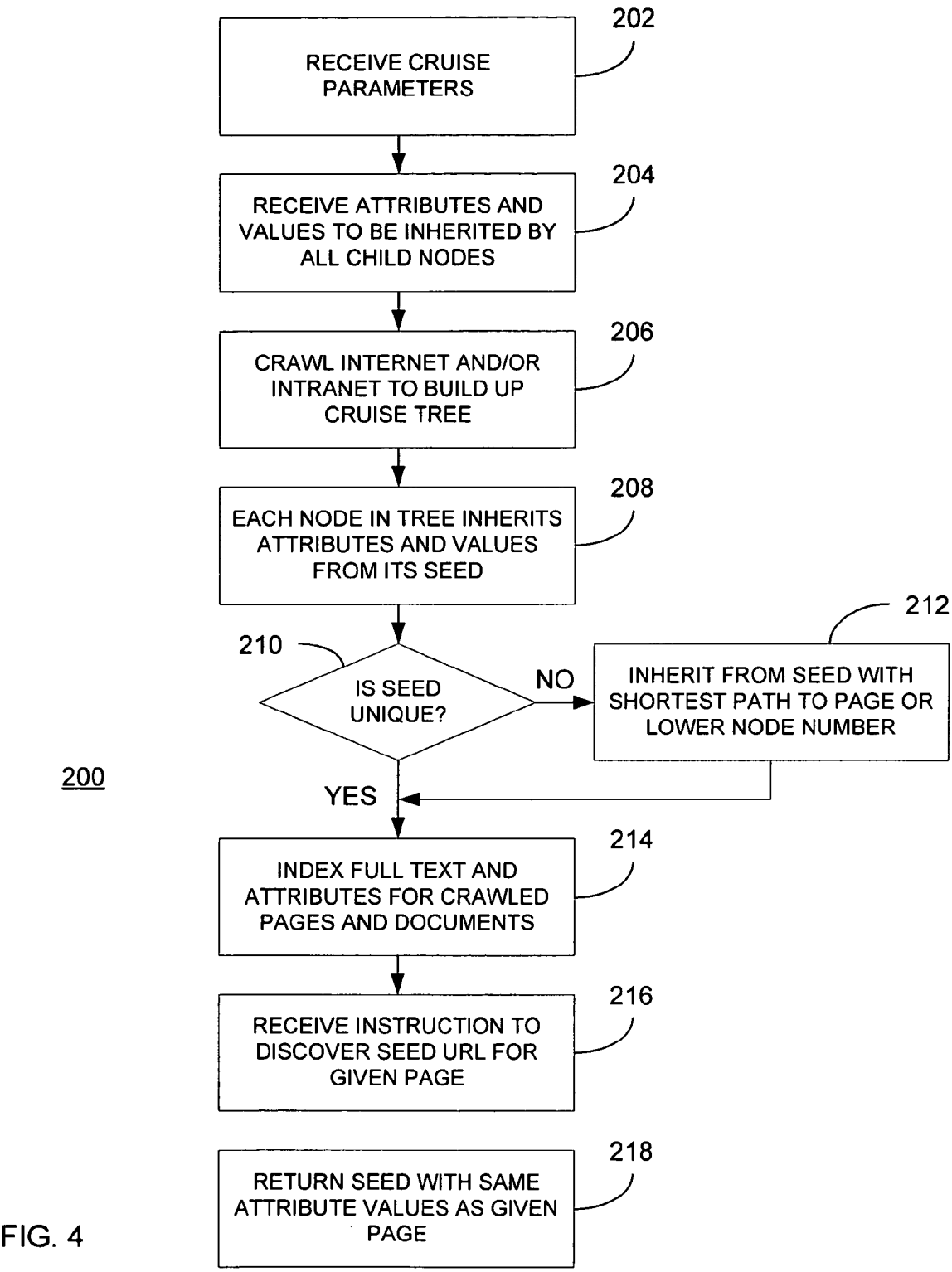
FIG. 4 shows a method for executing a cruise using attribute inheritance to identify crawl paths.

FIG. 4 illustrates a method 200 for executing a cruise using attribute inheritance to identify crawl paths in accordance with an exemplary embodiment. At 202, cruise parameters are specified. The cruise parameters include seed URLs, cruise depth, file types to be cruised, as well as exclusions to be omitted from the cruise. The cruise parameters are used by a web crawler to execute the specified cruise. At 204, the attributes and values to be inherited by all child nodes, or URLs, of parent nodes are specified and received.

At 206, the web crawler crawls the internet or other URL-based network to build up a cruise tree. The cruise tree includes all links originating from a seed URL and visited as specified by the cruise parameters. At 208, each node in the cruise tree inherits attributes and values from its seed, or in other words the URL from which it was found.

At 210, an analysis is made whether the seed URL for a given found URL is unique. If not, at 212 the found URL inherits attributes and associated values from the seed with the shortest path, or with the lowest number of nodes along a branch of the cruise tree. If the seed is unique, the full text of each crawled page and documents therein is indexed by the text mining engine of the index server, while the attributes and associated values of each crawled page are indexed by the attribute engine of the index server.

At 216, the web crawler receives instructions to discover a seed URL for a given page. The web crawler uses the indexed attributes and text to traverse the cruise tree to quickly return the seed with the same attribute values as the given page. Thus, for any page in the cruise tree generated by a cruise, a user perform an attribute search to discover which seed URL led to the page.

Although a few embodiments have been described in detail above, other modifications are possible. The logic flow depicted in FIG. 4 may be executed in an order other than that shown and still be within the scope of the embodiments described herein. Other embodiments may be within the scope of the following claims.

The invention claimed is:

1. A computer-implemented method comprising:

receiving cruise parameters comprising one or more seed uniform resource locator (URL) nodes that each define an origination of a crawl path of a web cruise operation, a cruise depth to be used for the crawl paths, one or more file types to be cruised during the web cruise operation, exclusions to be omitted during the web cruise operation, and a specification of an attribute set to be inherited by each of a plurality of crawl path URL nodes crawled from the one or more seed URL nodes along each crawl path, wherein each of the plurality of crawl path URL nodes along the crawl path has a child relationship to a preceding URL node along the crawl path and a parent relationship to a succeeding URL node along the crawl path;

building a cruise tree by crawling a network to retrieve contents and attribute set values from each and every of the crawl path URLs, the contents comprising text documents in one or more formats and document attributes for pages accessed at each crawl path URL node;

indexing the contents retrieved from each and every of the plurality of crawl path URLs along each crawl path into a first index and the attribute set values for each and every of the plurality of crawl path URLs along each crawl path into a second index, both indexes being stored in a database;

attaching, to each and every child URL node along each crawl path in the cruise tree, the attribute set values for each preceding URL node along the crawl path from one of the one or more seed URL nodes to the preceding node having the parent relationship unless a shorter crawl path from a different seed URL node has already been attached to the child URL node, each child node along each crawl path in the cruise tree inheriting attributes and values from the parent URL from which it was found along the crawl path;

receiving instructions to discover the seed URL node for given crawl path URL in the cruise tree; and traversing the cruise tree using the first index and the second index to determine which seed URL leads to the given crawl path URL by a shortest path.

2. A computer-implemented method in accordance with claim 1, wherein the cruise parameters further comprise URL access actions to generate each crawl path.

3. A computer-implemented method in accordance with claim 1, wherein the exclusions to be omitted during the web cruise operation include URL nodes to be excluded from the web cruise operation.

4. A computer-implemented method in accordance with claim 1, wherein the attribute values comprise an identifier of the URL for each crawl path URL node in the crawl path between the seed URL node and the individual URL node.

5. A computer-implemented method in accordance with claim 1, wherein the cruise tree includes all links originating from each seed URL and visited as specified by the cruise parameters.

6. A computer-implemented method in accordance with claim 1, further comprising sending the seed URL nodes to a preprocessor which generates "HTTP Gets" for each seed URL node to initiate the building of the cruise tree.

7. A system comprising a processor connected to a computer communication network, the processor performing operations comprising:

receiving cruise parameters comprising one or more seed uniform resource locator (URL) nodes that each define an origination of a crawl path of a web cruise operation, a cruise depth to be used for the crawl paths, one or more file types to be cruised during the web cruise operation, exclusions to be omitted during the web cruise operation, and a specification of an attribute set to be inherited by each of a plurality of crawl path URL nodes crawled from the one or more seed URL nodes along each crawl path, wherein each of the plurality of crawl path URL nodes along the crawl path has a child relationship to a preceding URL node along the crawl path and a parent relationship to a succeeding URL node along the crawl path;

building a cruise tree by crawling a network to retrieve contents and attribute set values from each and every of the crawl path URLs, the contents comprising text documents in one or more formats and document attributes for pages accessed at each crawl path URL node;

indexing the contents retrieved from each and every of the plurality of crawl path URLs along each crawl path into a first index and the attribute set values for each and every of the plurality of crawl path URLs along each crawl path into a second index, both indexes being stored in a database;

attaching, to each and every child URL node along each crawl path in the cruise tree, the attribute set values for each preceding URL node along the crawl path from one of the one or more seed URL nodes to the preceding node having the parent relationship unless a shorter crawl path from a different seed URL node has already been attached to the child URL node, each child node along each crawl path in the cruise tree inheriting attributes and values from the parent URL from which it was found along the crawl path;

receiving instructions to discover the seed URL node for given crawl path URL in the cruise tree; and traversing the cruise tree using the first index and the second index to determine which seed URL leads to the given crawl path URL by a shortest path.

8. A system in accordance with claim 7, wherein the cruise parameters further comprise URL access actions to generate each crawl path.

9. A system in accordance with claim 7, wherein the exclusions to be omitted during the web cruise operation include URL nodes to be excluded from the web cruise operation.

10. A computer-implemented method in accordance with claim 7, wherein the attribute values comprise an identifier of the URL for each crawl path URL node in the crawl path between the seed URL node and the individual URL node.

11. A computer-implemented method in accordance with claim 7, wherein the cruise tree includes all links originating from each seed URL and visited as specified by the cruise parameters.

12. A computer-implemented method in accordance with claim 7, further comprising sending the seed URL nodes to a preprocessor which generates "HTTP Gets" for each seed URL node to initiate the building of the cruise tree.

* * * * *

UNITED STATES PATENT AND TRADEMARK OFFICE
CERTIFICATE OF CORRECTION

PATENT NO.       : 7,577,671 B2                          Page 1 of 1
APPLICATION NO.  : 11/107596
DATED            : August 18, 2009
INVENTOR(S)      : Joshi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 357 days.

Signed and Sealed this

Seventh Day of September, 2010

David J. Kappos
*Director of the United States Patent and Trademark Office*